(12) United States Patent
Kamizono et al.

(10) Patent No.: US 10,705,225 B2
(45) Date of Patent: Jul. 7, 2020

(54) PREPARATION SYSTEM FOR SURVEYING OPERATION

(71) Applicant: Kabushiki Kaisha TOPCON, Tokyo (JP)

(72) Inventors: Fumihiko Kamizono, Tokyo (JP); Takashi Ogawa, Tokyo (JP)

(73) Assignee: Kabushiki Kaisha TOPCON, Tokyo (JP)

(*) Notice: Subject to any disclaimer, the term of this patent is extended or adjusted under 35 U.S.C. 154(b) by 220 days.

(21) Appl. No.: 14/897,980

(22) PCT Filed: Jun. 12, 2014

(86) PCT No.: PCT/JP2014/065527
§ 371 (c)(1),
(2) Date: Dec. 11, 2015

(87) PCT Pub. No.: WO2014/200043
PCT Pub. Date: Dec. 18, 2014

(65) Prior Publication Data
US 2016/0124093 A1    May 5, 2016

(30) Foreign Application Priority Data

Jun. 14, 2013  (JP) ................................ 2013-125120

(51) Int. Cl.
*G01S 19/43* (2010.01)
*G01C 5/00* (2006.01)
(Continued)

(52) U.S. Cl.
CPC ................ *G01S 19/43* (2013.01); *G01C 5/00* (2013.01); *G01C 15/002* (2013.01); *G01S 19/14* (2013.01)

(58) Field of Classification Search
CPC ......... G01C 5/00; G01C 15/002; G01S 19/43; G01S 19/14; G01S 19/48; G01S 19/41
See application file for complete search history.

(56) References Cited

U.S. PATENT DOCUMENTS 5,148,179 A    9/1992  Allison
5,563,607 A   10/1996  Loomis et al.
(Continued)

FOREIGN PATENT DOCUMENTS

CN       1673682 A      9/2005
EP     1 580 527 A3     4/2008
(Continued)

OTHER PUBLICATIONS

International Search Report issued in Application No. PCT/JP2014/065527, dated Aug. 12, 2014.
(Continued)

*Primary Examiner* — Bernarr E Gregory
(74) *Attorney, Agent, or Firm* — Studebaker & Brackett PC

(57) ABSTRACT

A preparation system for surveying operation of the present invention includes a mobile station disposed at a known observation point and a fixed station disposed at an unknown reference point. The preparation system includes an arithmetic step to determine the position coordinate of the unknown reference point based on positioning data received by the mobile station, positioning data received by the fixed station, and a position coordinate of the known observation point, and an assigning step to assign the unknown reference point whose position coordinate is determined as the known reference point.

6 Claims, 6 Drawing Sheets

(51) Int. Cl.
*G01S 19/14* (2010.01)
*G01C 15/00* (2006.01)
*G01S 19/48* (2010.01)
*G01S 19/41* (2010.01)
*G01S 19/00* (2010.01)

(56) References Cited

U.S. PATENT DOCUMENTS

| | | | |
|---|---|---|---|
| 5,739,785 A | | 4/1998 | Allison et al. |
| 6,104,339 A | * | 8/2000 | Nichols .................. G01S 19/41 |
| | | | 342/357.27 |
| 6,317,603 B1 | * | 11/2001 | Allison .................. G01S 19/04 |
| | | | 342/357.43 |
| 7,456,943 B1 | * | 11/2008 | Goad .................. G01C 15/002 |
| | | | 342/118 |
| 7,480,511 B2 | * | 1/2009 | O'Meagher ........... G01S 5/0063 |
| | | | 455/41.2 |
| 7,532,160 B1 | * | 5/2009 | Zimmerman ........... G01S 19/11 |
| | | | 342/357.27 |
| 2005/0211882 A1 | | 9/2005 | Ohtomo et al. |
| 2005/0212697 A1 | * | 9/2005 | Brabec ................ G01C 15/002 |
| | | | 342/357.27 |
| 2007/0058161 A1 | * | 3/2007 | Nichols .................. G01S 19/04 |
| | | | 356/139.01 |
| 2007/0241961 A1 | | 10/2007 | Ogawa et al. |
| 2007/0268179 A1 | | 11/2007 | Ogawa et al. |
| 2008/0100506 A1 | * | 5/2008 | Gradine .................. G01S 19/43 |
| | | | 342/357.41 |
| 2010/0149032 A1 | * | 6/2010 | Feller .................. G01S 19/05 |
| | | | 342/357.43 |
| 2013/0116908 A1 | | 5/2013 | Oh et al. |
| 2013/0335266 A1 | * | 12/2013 | Vollath .................. G01S 19/43 |
| | | | 342/357.25 |
| 2014/0002300 A1 | * | 1/2014 | Leandro .................. G01S 19/44 |
| | | | 342/357.27 |

FOREIGN PATENT DOCUMENTS

| | | |
|---|---|---|
| JP | H04-175606 A | 6/1992 |
| JP | H09-292224 A | 11/1997 |
| JP | 2002-181917 A | 6/2002 |
| JP | 2005-274229 A | 10/2005 |
| JP | 2007-271429 A | 10/2007 |
| JP | 2007-271627 A | 10/2007 |
| JP | 2007-309667 A | 11/2007 |

OTHER PUBLICATIONS

An Office Action mailed by the Japanese Patent Office dated Oct. 3, 2017, which corresponds to Japanese Patent Application No. 2013-125120 and is related to U.S. Appl. No. 14/897,980.

The extended European search report issued by the European Patent Office dated Jan. 11, 2017, which corresponds o European Patent Application No. 14810846.7-1557 and is related to U.S. Appl. No. 14/897,980.

An Office Action mailed by the European Patent Office dated Jun. 22, 2018, which corresponds to European Patent Application No. 14810846.7-1003 and is related to U.S. Appl. No. 14/897,980.

Summons to attend oral proceedings pursuant to Rule 115(1) EPC issued by the European Patent Office dated Jan. 30, 2020, which corresponds to European Patent Application No. 14810846.7-1001 and is related to U.S. Appl. No. 14/897,980.

Tomasz Lipecki: "The Modem Technologies of DGPS and RTK Corrections Transfer"; Geomatics and Environmental Engineering, Jan. 1, 2007; pp. 67-76; vol. 1, No. 3; XP055659027.

\* cited by examiner

PREPARATION SYSTEM FOR SURVEYING OPERATION

CROSS-REFERENCE TO RELATED APPLICATION

The present application is based on and claims priority from Japanese Patent Application No. 2013-125120, filed on Jun. 14, 2013, and the disclosure of which is hereby incorporated by reference in its entirety.

This invention is related to a preparation system for surveying operation. In particular, the preparation system includes a mobile station disposed at an observation point, where a position coordinate is unknown, and a fixed station disposed at a reference point, where a position coordinate is known, and the system receives positioning data from satellites by the mobile station and the fixed station and determines the position coordinate of the observation point by correcting the received data with observation correction data sent from the fixed station.

BACKGROUND ART

Conventionally, a surveying operation system (RTK surveying method) is known. The system includes a fixed station disposed at a reference point (an observation point at which the fixed station is positioned), where the position coordinate is known, and a mobile station disposed at an observation position, where the position coordinate is unknown. The system receives positioning data from satellites at the fixed station and mobile station while moving the mobile station, and determines the position coordinate of the unknown observation point using the mobile station by correcting the received data with observation correction data sent from the fixed station (see Patent Literature 1, Patent Literature 2, JP2007-271429A, for example).

SUMMARY

By disposing the fixed station at an observation point where the position coordinate is known, the observation point is occupied by the fixed station. As a result, it becomes impossible to use the known reference point for another object, i.e., the known observation point is exclusively used for the fixed station only.

To overcome such a deficiency, a preparation system is known. In the preparation system, a fixed station is disposed at a reference point where the position coordinate is unknown, and the preparation system receives the positioning data from the fixed station. Before surveying an unknown observation point; the preparation system determines the position coordinate of the unknown reference point through independent positioning method based on the received positioning data and assigns the determined position coordinate as a position coordinate of a known reference point.

However, since the radio waves have fluctuations and the like, it is difficult for the preparation system to accurately determine the unknown position coordinate of the unknown reference point based on the positioning data. Therefore, the preparation system repeatedly acquires positioning data of the unknown reference point through independent positioning method and statistically processes the acquired data. The system then assigns the processed position coordinate as a position coordinate of a known reference point.

The conventional preparation system for surveying operation, however, needs to acquire the positioning data repeatedly to perform the statically processing. That is, the system takes more time to determine the position coordinate of the unknown reference point and to assign the processed position coordinate as a positioning coordinate of a known reference point.

An object of the present invention is, therefore, to provide a preparation system for surveying operation that disposes a fixed station at a reference point where the position coordinate is unknown, determines the position coordinate of the reference point, and assigns the determined position coordinate as a known reference point.

Solution to Problem

An aspect of a preparation system for surveying operation according to the present invention includes a mobile station disposed at an observation point where a position coordinate is known and a fixed station disposed at a reference point where a position coordinate is unknown. The system includes an arithmetic step to determine the position coordinate of the unknown reference point based on positioning data received by the mobile station from satellites, positioning data received by the fixed station from satellites, and a position coordinate of the known observation point, and an assigning step to assign the unknown reference point whose position coordinate is determined as a known reference point.

DESCRIPTION OF EMBODIMENTS

Embodiment 1

Figure 1:
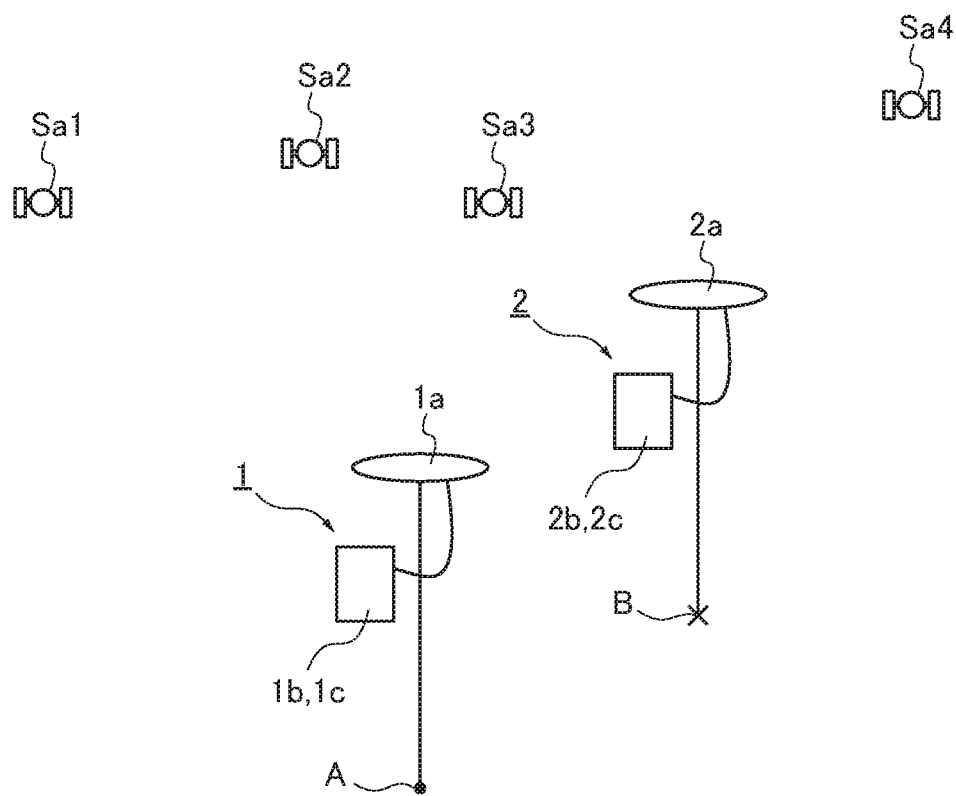
FIG. 1 is a view for schematically showing a surveying operation system according to the present invention.

FIG. 1 is a view for schematically showing a surveying operation system according to the present invention.

Figure 2:
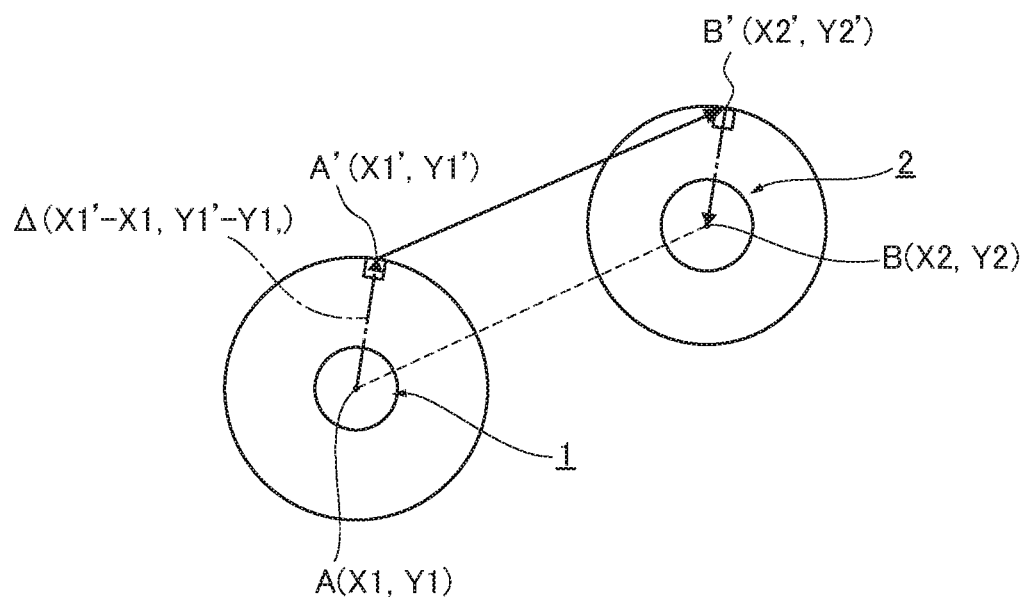
FIG. 2 is an explanatory view for explaining a relationship of the known reference point, the unknown reference point, and positioning data.

In FIG. 1, reference number 1 denotes a fixed station, and reference number 2 denotes a mobile station. As illustrated in FIGS. 1 and 2, the fixed station 1 is disposed at a reference point (known observation point) A where the position coordinate is known for RTK surveying method. The reference sign A (X1, Y1) in FIG. 2 represents a horizontal position coordinate of the known reference point A.

As illustrated in FIGS. 1 and 2, the mobile station 2 is disposed at an observation point B where the position coordinate is unknown. The reference sign B (X2, Y2) in FIG. 2 represents a horizontal position coordinate of the unknown observation point B.

The fixed station 1 is equipped with a fixed-station satellite positioning section (GPS device) 1a, a communication device 1b, and an arithmetic section 1c. The mobile station 2 is equipped with a mobile-station satellite positioning section (GPS device) 2a, a communication device 2b, and an arithmetic section 2c.

The fixed-station satellite positioning section 1a and the mobile-station satellite positioning section 2a each receives positioning data from at least four satellites Sa1 to Sa4, as illustrated in FIG. 1. Accordingly, the fixed station 1 acquires a horizontal position coordinate A' (X1', Y1'), and the mobile station 2 acquires a horizontal position coordinate B' (X2', Y2') as positioning data, as illustrated in FIG. 2.

The arithmetic section 1c calculates correction data $\Delta$ (X1'−X1, Y1'−Y1) in accordance with the acquired horizontal position coordinate A' (X1', Y1') and the known horizontal position coordinate A (X1, Y1) of the reference point A.

The correction data $\Delta$ is sent from the communication device 1b to the communication device 2b. The arithmetic section 2c calculates a horizontal position coordinate B (X2, Y2) of the unknown reference point B in accordance with the acquired horizontal position coordinate B' (X2', Y2') and the calculated correction data $\Delta$ (X1'−X1, Y1'−Y1).

The equation to calculate the data $\Delta$ is as follows:

$$X2=X2'-X1'+X1, Y2=Y2'-Y1'+Y1$$

That is, the arithmetic section 2c determines a horizontal relative position relationship of the mobile station 2 with respect to the fixed station 1 based on the positioning data of the known reference point A and the positioning data of the unknown observation point B, and further determines the horizontal position coordinate of the unknown observation point B based on the determined horizontal relative position relationship and the horizontal position coordinate of the known reference point A in real time.

If the fixed station 1 is disposed at the known reference point A, the known reference point A is occupied by the fixed station until the RTK surveying operation is completed. That is, it becomes impossible to use the known reference point A for any other object.

Figure 3:
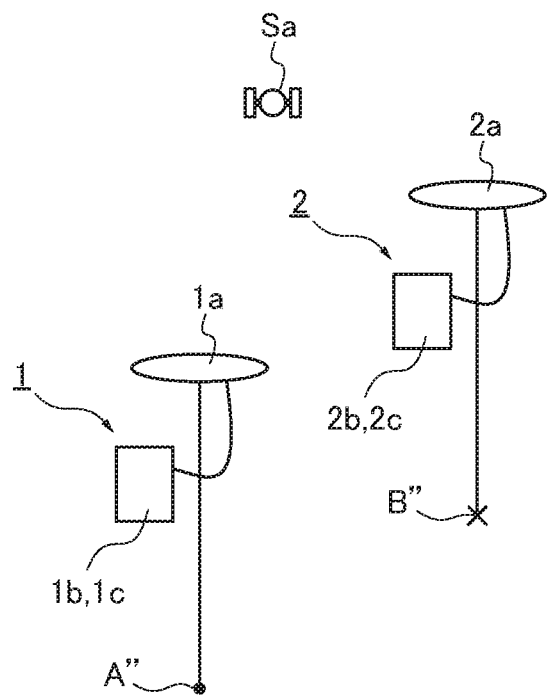
FIG. 3 is an explanatory view for explaining an overall idea of a preparation system for surveying operation of a first embodiment according to the present invention.

To overcome such a deficiency, a preparation system illustrated in FIG. 3 is used to prepare for determining the horizontal position coordinate of the unknown observation point B using the mobile station 2. The preparation system determines a horizontal position coordinate of an unknown reference point A" by disposing the fixed station 1 at the unknown reference point A" and the mobile station 2 at a known observation point B", and assigns the determined horizontal position coordinate as a known reference point A.

Figure 4:
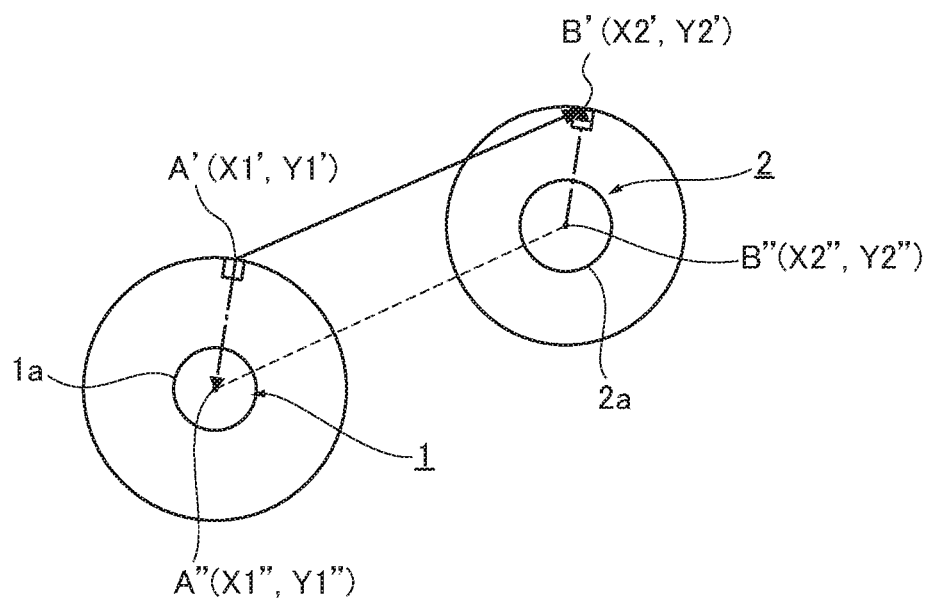
FIG. 4 is an explanatory view for showing a relationship of the unknown reference point, the known reference point, and positioning data.

As illustrated in FIG. 4, in the preparation system the fixed station 1 acquires the horizontal position coordinate A' (X1', Y1') of the unknown reference point A" as the positioning data using the fixed-station satellite positioning section 1a. The arithmetic section 1c then sets the acquired horizontal position coordinate A' (X1', Y1') of the unknown reference point A" as an initial location data.

By referring observation correction data sent from the fixed station 1, the mobile station 2 acquires the horizontal position coordinate B' (X2', Y2') of the known observation point B" using the mobile-station satellite positioning section 2a.

The horizontal position coordinate B' (X2', Y2') of the mobile station 2 and the horizontal position coordinate B" (X2", Y2") of the known observation point B" are then sent to the fixed station 1 by the communication device 2b.

Based on the acquired horizontal position coordinate A' (X1', Y1'), which is used as the initial location data, and the horizontal position coordinate B' (X2', Y2'), which is used as the positioning data, as well as the horizontal position coordinate B" (X2", Y2") of the known observation point B" sent from the mobile station 2; the arithmetic section 1c determines the horizontal position coordinate A" (X1", Y") of the unknown reference point A" using the following equation:

$$X1"=X1'-X2'+X2", Y1"=Y1'-Y2'+Y2"$$

That is, the arithmetic section 1c executes an arithmetic step of determining the horizontal position coordinate A" (X1", Y1") of the unknown reference point A" based on the positioning data sent from the mobile station 2, the positioning data acquired by the fixed station 1, and the known position coordinate B" (X2", Y2") of the observation point B". Further, the arithmetic section 1c executes an assigning step for assigning the determined reference point A" as the horizontal position coordinate A" (X1", Y1") of the known reference point A.

In other words, the arithmetic section 1c of the fixed station 1 determines a horizontal relative position relationship of the unknown reference point A" with respect to the known observation point B" based on the initial location data and the positioning data acquired by the mobile station 2. The arithmetic section 1c then determines the horizontal position coordinate (X1", Y1") of the unknown reference point A", at which the fixed station 1 is disposed, based on the determined horizontal relative position relationship and the horizontal position coordinate B" (X2", Y2") of the known observation point B", and assigns the determined horizontal position coordinate (X1", Y1") as the position coordinate of the known reference point A. That is:

$$X1=X1", Y1=Y1"$$

In Embodiment 1, the preparation system can assign the unknown reference point A" as the known reference point A without acquiring positioning data of the unknown reference point A" through independent positioning method and performing statically processing to assign the unknown reference point A" as the known reference point A. As a result, the preparation system according to Embodiment 1 can easily perform a preparation for surveying operation.

Here, the calculation to determine the reference point A may be carried out by the arithmetic section 2c of the mobile station 2, and the mobile station 2 sets (sends) the determined position coordinate to the fixed station 1.

Note in Embodiment 1, the altitude data as a part of the positioning data is also acquired and input to the arithmetic section 1c.

Embodiment 2

In Embodiment 1, the altitude data is calculated in accordance with the positioning data sent from the satellites and input to the arithmetic section 1c. However, the survey operation may need an accurate altitude data. Therefore, the preparation system of Embodiment 2 is configured to automatically determine accurate vertical position coordinates.

Figure 5:
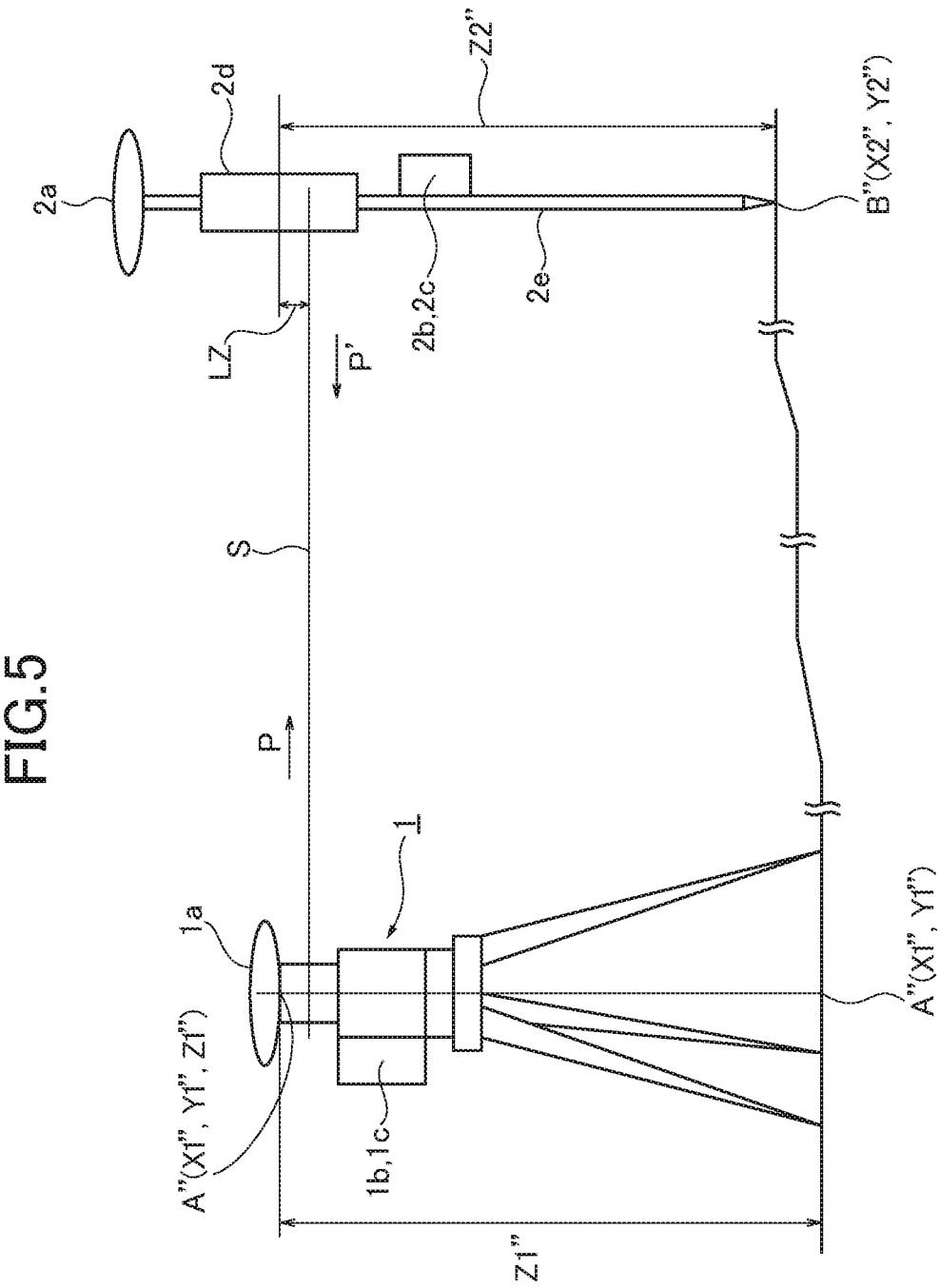
FIG. 5 is an explanatory view for explaining an overall idea of a preparation system for surveying operation of a second embodiment according to the present invention.

A fixed station 1 of Embodiment 2 is configured with an electronic level device (surveying device). As illustrated in FIG. 5, the electronic level device irradiates a laser beam P to form a horizontal reference surface S. The electronic level device includes a fixed-station satellite positioning section 1a, a communication device 1b, and an arithmetic section 1c.

A target 2d to measure an altitude (height) is attached on a pole 2e of a mobile station 2 at a reference height Z2" from the ground at the known observation point B". The altitude data of the reference height Z2" is sent to the communication device 1b by a communication device 2b of the mobile station 2.

The electronic level device irradiates a laser beam P to the target 2d to form the horizontal reference surface S and receives a reflected laser beam P' reflected by the target 2d so as to determine a relative height LZ of the electronic level device with respect to the target 2d of the mobile station 2.

Based on the relative height LZ and the reference height Z2", the arithmetic section 1c calculates a height Z1" at the unknown reference point A" and assigns the calculated height as a vertical position coordinate Z1 of the known reference point A.

The equation to calculate the height Z1 is as follows:

$$Z1=Z1''=Z2''+LZ$$

As described, in Embodiment 2, the arithmetic section 1c determines the vertical position coordinate Z1" of the unknown reference point A" and assigns the determined vertical position coordinate as the vertical position coordinate Z1 of the known reference point A based on the relative height LZ and the reference height Z2".

Figure 6:
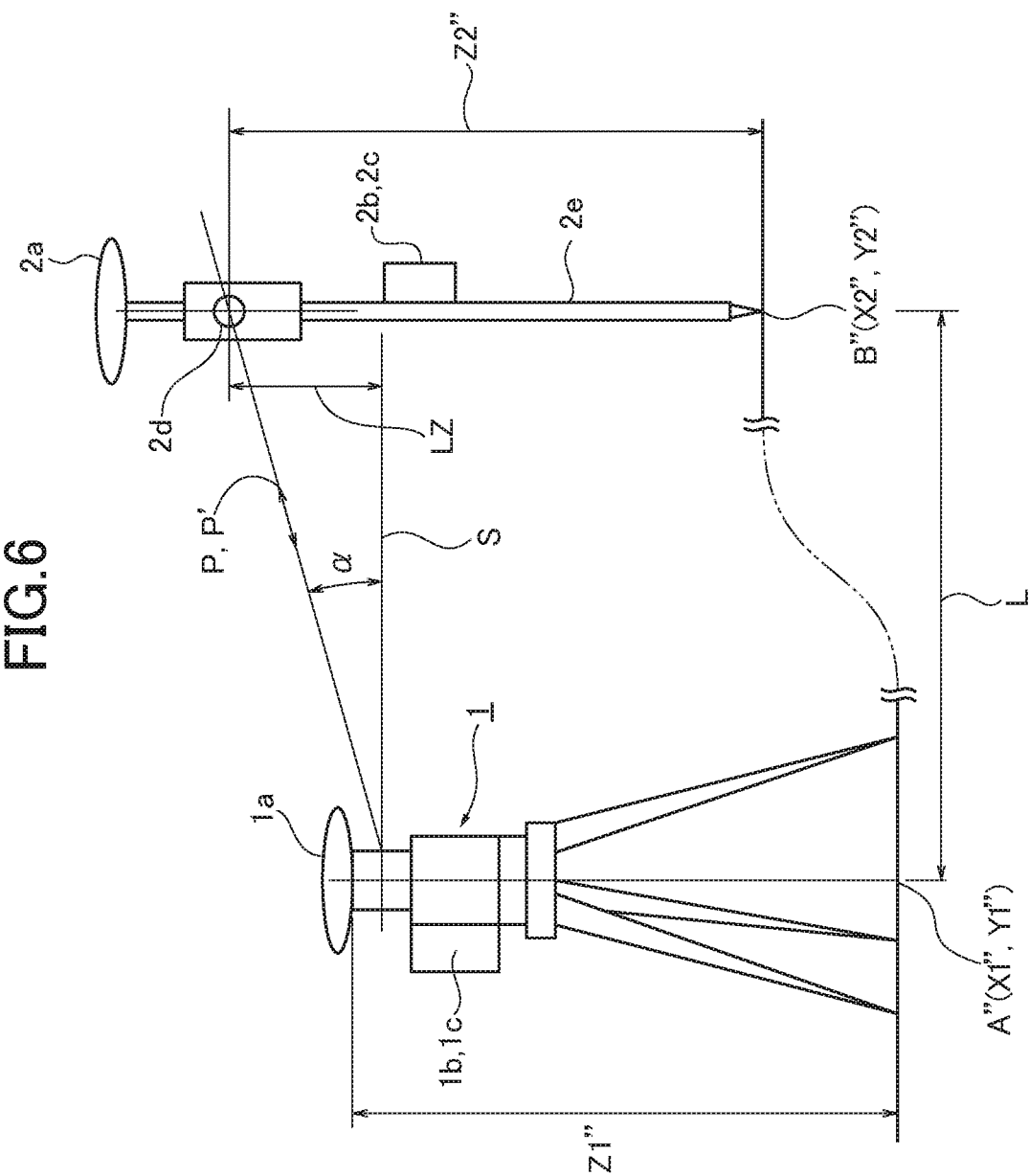
FIG. 6 is an explanatory view for explaining a variation of the preparation system for surveying operation of the second embodiment according to the present invention.

On the other hand, the arithmetic section 1c can detect an altitude angle α of the target 2d with respect to the horizontal reference surface S, determine a difference (X1'−X2', Y1'−Y2') between the unknown reference point A" and the known observation point B" in the horizontal direction, and then determine a horizontal distance L from the fixed station 1 to the mobile station 2, as illustrated in FIG. 6. Accordingly, the arithmetic section 1c can determine the relative height LZ based on the horizontal distance L and the altitude angle α.

Consequently, the arithmetic section 1c can determine the vertical position coordinate Z1" of the unknown reference point A", at which the fixed station 1 is disposed, and assign the determined vertical position coordinate Z1" as the vertical position coordinate Z1 of the known reference point A.

Note that in Embodiment 2, the electronic level device is used for the fixed station 1 as the laser surveying device. However, as long as the fixed station can determine the height of the target 2d, it should not be limited thereto. A laser level device or a total station may be used as the laser surveying device instead of the electronic level device.

Embodiment 3

Figure 7:
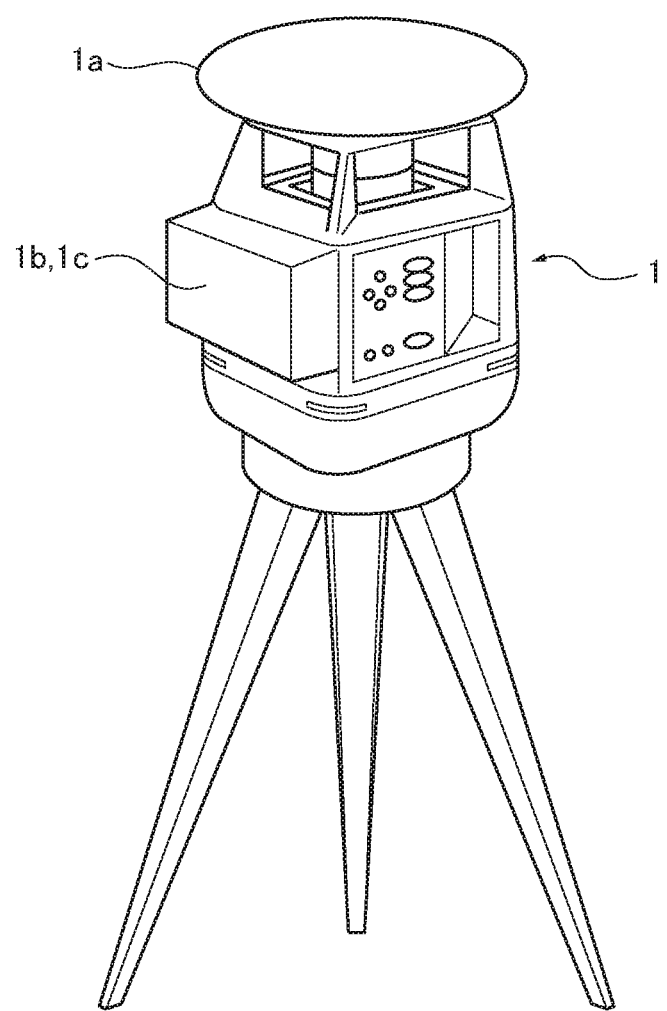
FIG. 7 is a perspective view for showing an outlook appearance of a rotating laser device used in a preparation system for surveying operation of a third embodiment according to the present invention.

As illustrated in FIG. 7, a preparation system of Embodiment 3 adopts a rotating laser device as a surveying device of the fixed station 1. The rotating laser device includes a satellite positioning section 1a, a communication device 1b, and an arithmetic section 1c.

Figure 8:
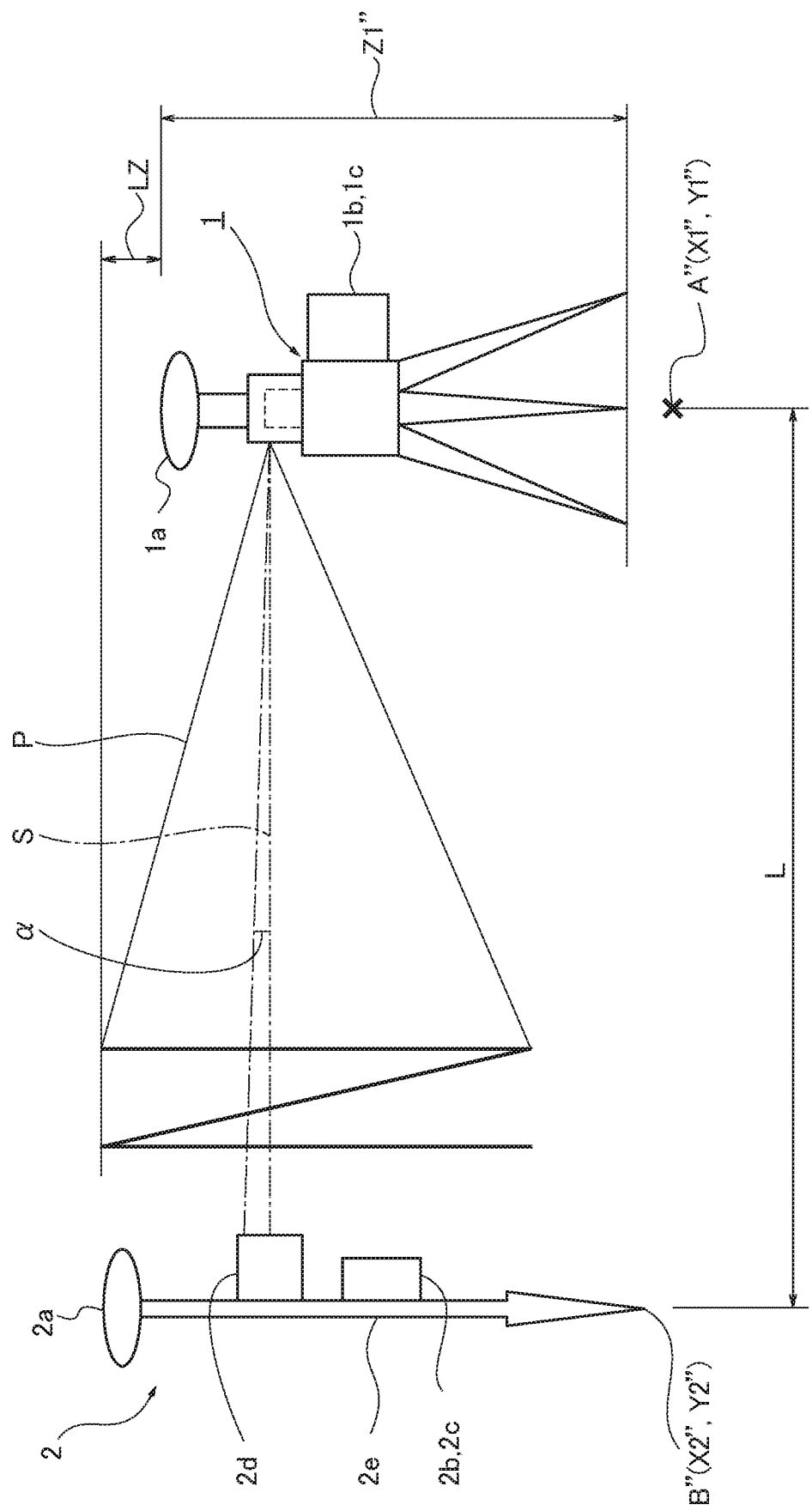
FIG. 8 is an explanatory view for explaining an overall idea of a preparation system for surveying operation of a third embodiment according to the present invention.

As illustrated in FIG. 8, a mobile station 2 of Embodiment 3 includes a satellite positioning section 2a, a communication device 2b, an arithmetic section 2c, and a target 2d.

The rotating laser device rotates and irradiates a fan-shaped laser beam P tilted against a horizontal reference surface S. Here, the rotating laser device irradiates a fan-shaped laser beam P having an N-shape. For the rotating laser device, a known configuration (for instance, JP2007-271627 A) is applicable.

The arithmetic section 1c determines a relative height LZ of the fixed station 1 with respect to the mobile station 2 based on positioning data acquired by the mobile-station satellite positioning section 2a and positioning data acquired by the fixed-station satellite positioning section 1a.

Further, the arithmetic section 1c determines an altitude data Z1" at an unknown reference point A" based on the determined relative height LZ and an altitude angle α of a target 2d with respect to the horizontal reference surface S.

Note that a method to calculate the relative height LZ is the same as that described above.

The invention claimed is:

1. A preparation system for an RTK measurement, comprising:
   a rover station physically located at an observation point, wherein a position coordinate of the observation point is known; and
   a single base station physically located at a reference point, wherein a position coordinate of the reference point is unknown, and wherein
   the base station:
      receives from the rover station, positioning data of the rover station determined based on data received by the rover station from at least four satellites,
      determines positioning data of the base station based on data received by the base station from at least four satellites,
      determines the position coordinate of the reference point, at which the base station is physically located, based on the determined positioning data of the rover station, the determined positioning data of the base station, and the known position coordinate of the observation point, and
      assigns a coordinate value on a horizontal surface of the determined position coordinate as a new known horizontal position coordinate for the reference point at which the base station is physically located.

2. The preparation system according to claim 1, wherein the rover station includes a target to measure a height, and the base station:
   measures the height of the target to acquire a relative height of the base station with respect to the target,
   determines a vertical coordinate value on a vertical surface at the reference point based on the measured height and the acquired relative height, and
   assigns the determined vertical coordinate value as a new known vertical position coordinate for the base station.

3. The preparation system according to claim 1, wherein the rover station includes a target to measure a height, and the base station:
   determines a horizontal position relationship between the reference point and the observation point based on the determined positioning data of the rover station and the determined positioning data of the base station,
   detects an altitude angle of the target with respect to a reference plane, and
   determines a vertical coordinate value on a vertical surface at the reference point based on the determined horizontal position relationship and the detected altitude angle.

4. The preparation system according to claim 3, wherein
the base station is a surveying device including a satellite positioning section, and
the surveying device is any one of an electronic level device, a laser level device, and a total station to form the reference plane.

5. The preparation system according to claim 1, wherein
the rover station includes a target to measure a height,
the base station is a surveying device having a satellite positioning section,
the surveying device is a laser surveying device that rotates and radiates a fan-shaped laser beam tilted against a reference plane, and
the base station:
   determines a relative height of the base station with respect to the rover station based on the determined positioning data of the rover station and the determined positioning data of the base station, and
   determines a vertical coordinate value on a vertical surface at the reference point based on the determined relative height and an elevation angle of the target with respect to the reference plane.

6. A method for performing an RTK measurement using a preparation system including a rover station physically located at an observation point, wherein a position coordinate of the observation point is known, and a single base station physically located at a reference point, wherein a position coordinate of the reference point is unknown, the method comprising:
   receiving, by the base station, from the rover station, positioning data of the rover station determined based on data received by the rover station from at least four satellites;
   determining, by the base station, positioning data of the base station based on data received by the base station from at least four satellites;
   determining, by the base station, the position coordinate of the reference point, at which the base station is physically located, based on the determined positioning data of the rover station, the determined positioning data of the base station, and the known position coordinate of the observation point; and
   assigning, by the base station, a coordinate value on a horizontal surface of the determined position coordinate as a new known horizontal position coordinate for the reference point at which the base station is physically located.

* * * * *